Feb. 6, 1951     R. L. JEAN-BAPTISTE BODY     2,540,386

LEVER-BALANCE WEIGHING SCALE

Filed July 25, 1945

Inventor

R. L. J-B. Body

By Hascock Downing &c.
Attorneys

Patented Feb. 6, 1951

2,540,386

UNITED STATES PATENT OFFICE 2,540,386

LEVER-BALANCE WEIGHING SCALE

René Louis Jean-Baptiste Body, Paris, France, assignor to Societe Anonyme des Etablissements Charles Testut, Paris, France, a firm Application July 25, 1945, Serial No. 607,058
In France February 15, 1944

Section 1, Public Law 690, August 8, 1946
Patent expires February 15, 1964

5 Claims. (Cl. 265—62)

My invention has for its object improved lever-balance weighing scales of the type including a rack mechanism inserted between the scale proper and the indicator. A conventional scale of this type has been illustrated for allowing an easier disclosure in Fig. 1 of accompanying drawings. It comprises as shown a lever of the first order AOB on which the load acts at A while the pivot is formed by the knife O and B is the counterweight. The lever arm of the load is the horizontal projection of the distance OA.

In order to obtain equidistant divisions on the indicator controlled by the rotation of the lever, for giving out equal increases in weight, the indicator constituted by the hand 4 moving over the dial 5 is controlled by the pinion 3 rigid with the hand 4 and actuated by rack 2 meshing with the toothed sector FG adapted to move angularly in unison with the balance lever AOB.

My invention has for its object improvements in such weighing scales wherein the control of this rack arrangement is provided in an improved manner adapted to reduce the effort and friction on the scale proper so that the indications given out may be as accurate as possible without being affected by the reaction of the gearwork on the balance.

In accompanying drawing illustrating diagrammatically a working example of my improved scale:

Figure 1:
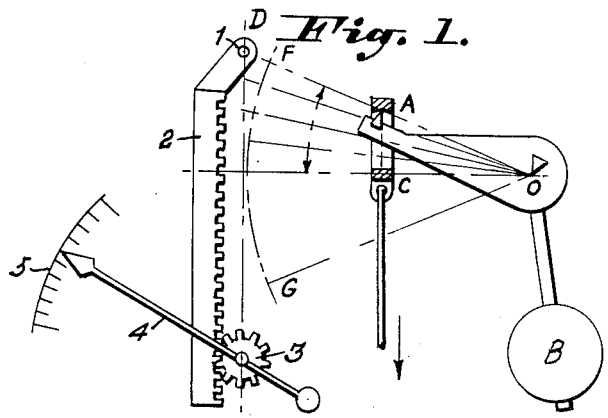
Fig. 1 is as stated an explanatory diagram.

From the above disclosure relating to Fig. 1 it is apparent that striking a tangent DE to the arc of a circle FG described round the fulcrum O of the lever by a point moving with the lever under the action of the load, the divisions on such a tangent remain equidistant for regularly increasing loads whereas they are not found to be so when measured on the circular line FG. Now it is possible according to my invention to guide along said tangent DE the point I of a rack 2 engaging the pinion 3 rigid with the index 4 moving in front of the scale 5, so that the deflection of said index or pointer will be proportional to the load and the graduations on the scale will be again equidistant.

Figure 2:
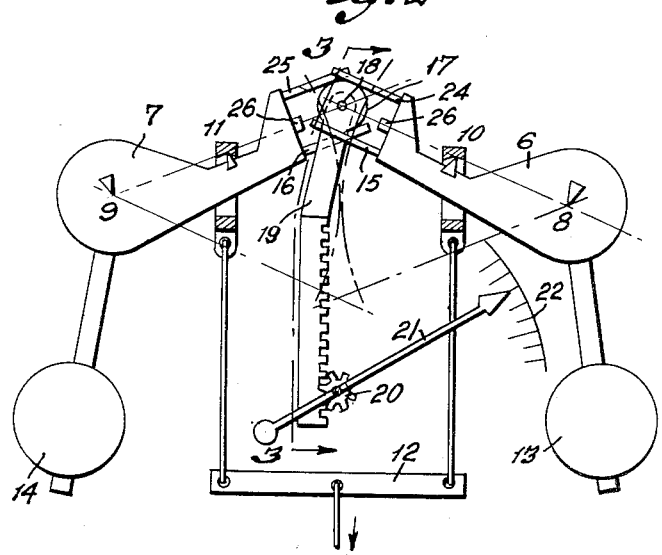
Fig. 2 is a diagrammatic showing of a first embodiment of my invention.

In the embodiment of Fig. 2 which is a practical form of execution of the arrangement referred to, two elementary scale levers 6 and 7 symmetrical with reference to a vertical line are used, said levers being fulcrumed respectively on the knives 8 and 9. The common load is transmitted to them through an equalizer bar 12 that acts through its ends on the load bearings 10 and 11 of the two levers. The weights 13, 14 of the levers are arranged on the outside of the fulcrum and the load bearing on the inside thereof.

The elementary scale levers are rigid with guiding means 15 and 16 which are substantially parallel with the line connecting the fulcrum and load bearing on the corresponding lever so that a common slider or roller 17 adapted to slide longitudinally over both members 15 and 16 may have its axis constantly at the intersection of the two fulcrum load-bearing lines of the two levers. This common roller 17 carries the vertical rack 19 that is constrained to permanently engage the pinion 20 on which is mounted the pointer 21 adapted to move over the scale 22 and consequently to move along the line of symmetry of the two-lever arrangement which line is tangent to the two symmetrical circular lines shown in dot and dash lines in Fig. 2 and described round the two fulcrums. Thus the deflections of the pointer 21 are proportional to the loads and the divisions on the scale 22 are all equal.

Figure 3:
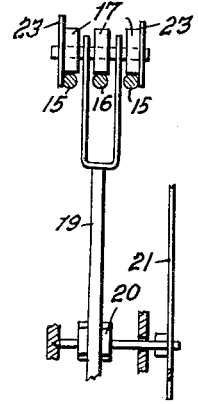
Fig. 3 is a cross-section through line III—III of Fig. 2.

Side cheeks such as 23 may be provided as shown in Fig. 3 to guide the roller 17 while any possible upward movement is limited by counter guides 24 and 25 parallel to 15 and 16 and carried rigidly by the corresponding levers symmetrically with reference to the fulcrum load-bearing lines.

In order to prevent the roller 17 from moving out of its correct position between the guides and counter guides when the latter are horizontal, stops 26 are carried by the end of the levers in register with the center of the roller to hold the latter correctly in position.

Figure 4:
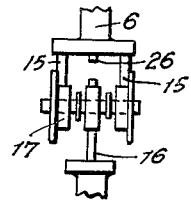
Fig. 4 is a plan view of a detail of the arrangement.

Fig. 4 is a horizontal view of Fig. 3 showing the arrangement of guides 15 and 16, guide 15 being rigid with the lever 6 and guide 16 with the lever 7.

Figure 5:
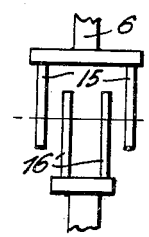
Fig. 5 shows a modified detail.

Fig. 5 shows that two horizontally spaced guides may be provided on each of the levers 6, 7 and of course various combinations may be provided such as that including two guide members 15 associated with one guide member 16 as shown in Fig. 4

Figure 6:
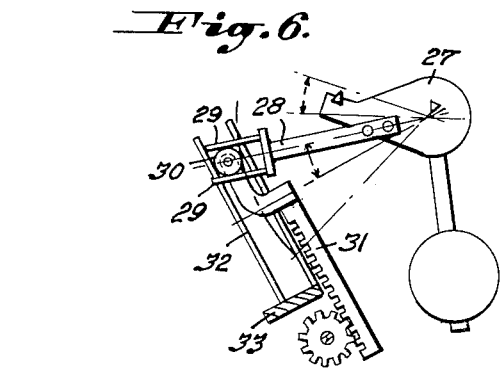
Fig. 6 shows a further embodiment of my improved arrangement.

In the modification illustrated in Fig. 6, the arrangement includes a single lever 27, to which lever is rigidly secured an arm 28 provided with two parallel superposed guides 29 between which is arranged the roller 30 carrying the rack 31. This roller is further constrained to move between parallel guides 32 fastened to frame 33 of the weighing machine so as to constrain the rack 31 engaging its pinion to move in parallelism with said guides.

Of course, in any embodiment of my invention, the guiding members such as 15 or 29 may or may not be parallel with a line passing through the fulcrum of the corresponding lever and the load bearing point. At any rate the angle made with said line should not be considerable in order to reduce the friction and wear.

It is possible to make the pointer 21 execute more than one revolution under the action of the rack in order to increase the accuracy of the weighing machine. This possibility of making the pointer rotate through several revolutions leads to a less bulky indicating instrument.

Obviously many modifications may be brought to the above examples of execution without unduly widening thereby the scope of my invention as defined in accompanying claims.

What I claim is:

1. In a lever balance weighing scale the combination of two similar levers arranged symmetrically to either side of a vertical line and having a weight at the remote ends of said levers, a fulcrum at a point of their length, a load bearing near their front ends, an equalizer bar through which the weight to be measured is applied symmetrically to the load bearings of both levers, guiding means rigid with the front end of each lever and crossing one another in vertical projection over the vertical line of symmetry above mentioned, a sliding member adapted to be held by the guiding means at the cross-point thereof, a rack member carrying said slider, a stationary pivot, a pinion rotatably carried thereby and in permanent mesh with the rack member and indicating means controlled by said pinion.

2. In a lever balance weighing scale the combination of two similar levers arranged symmetrically to either side of a vertical line and having a weight at the remote ends of said levers, a fulcrum at a point of their length, a load bearing near their front ends, an equalizer bar through which the weight to be measured is applied symmetrically to the load bearings of both levers, guiding means rigid with the front end of each lever extending in alignment with the corresponding fulcrum load bearing line and crossing one another in vertical projection over the vertical line of symmetry above mentioned, a sliding member adapted to be held by the guiding means at the cross-point thereof, a substantially vertical rack member carrying said slider, a stationary pivot, a pinion rotatably carried thereby and in permanent mesh with the rack member and indicating means controlled by said pinion.

3. In a lever balance weighing scale, the combination of a lever having its fulcrum at a point of its length, a weight at one end of said lever and a load bearing near the other end of said lever, double guiding means rigid with and extending beyond last mentioned end of the lever, said guiding means extending substantially parallel to the fulcrum-load bearing line of said lever, a slider supported by said guiding means for sliding movement therealong, a downwardly directed rack secured through its upper end to said slider, a pinion in permanent mesh with said rack, auxiliary guiding means holding the slider on a stationary line passing through the pinion axis and parallel with the rack, a pointer rigid with the pinion and a stationary dial cooperating with said pointer.

4. In a lever balance weighing scale, the combination of a lever having its fulcrum at a point of its length, a weight at one end of said lever and a load bearing near the other end of said lever, double guiding means rigid with and extending beyond last mentioned end of the lever, said guiding means extending substantially parallel to the fulcrum-load bearing line of said lever, a slider supported by said guiding means for sliding movement therealong, a downwardly directed rack secured through its upper end to said slider, a pinion in permanent mesh with said rack, a stationary guideway arranged at an angle with the possible positions of the first guiding means and inside which the slider is adapted to slide in substantial parallelism with the rack, a pointer rigid with the pinion and a stationary dial cooperating with said pointer.

5. In a lever balance weighing scale, the combination of a lever having its fulcrum at a point of its length, a weight at one end of said lever and a load bearing near the other end of said lever, two parallel guiding members rigid with the last mentioned end of the lever and extending to the outside thereof symmetrically of a line substantially aligned with the fulcrum and load-bearing, a roller adapted to roll between said members in the direction of said line, a downwardly directed rack secured through its upper end to said roller, means guiding said roller for movement along a line substantially parallel with said rack, a pinion in permanent mesh with said rack, a pointer rigid with the pinion and a stationary dial cooperating with said pointer.

RENÉ LOUIS JEAN-BAPTISTE BODY.

REFERENCES CITED

The following references are of record in the file of this patent:

UNITED STATES PATENTS

| Number | Name | Date |
| --- | --- | --- |
| 1,657,139 | Wasson | Jan. 24, 1928 |
| 1,749,747 | Hadley | Mar. 4, 1930 |
| 1,871,659 | Cameron | Aug. 16, 1932 |
| 1,979,822 | Cameron | Nov. 6, 1934 |
| 2,030,457 | Lewis | Feb. 11, 1936 |

FOREIGN PATENTS

| Number | Country | Date |
| --- | --- | --- |
| 3,760 | Great Britain | Dec. 31, 1903 |